US006959257B1

(12) United States Patent
Larky et al.

(10) Patent No.: US 6,959,257 B1
(45) Date of Patent: Oct. 25, 2005

(54) APPARATUS AND METHOD TO TEST HIGH SPEED DEVICES WITH A LOW SPEED TESTER

(75) Inventors: Steven P. Larky, Del Mar, CA (US); Paul D. Berndt, Woodinville, WA (US); Mike Lewis, Escondido, CA (US); Scott Swindle, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 28 days.

(21) Appl. No.: 09/658,597

(22) Filed: Sep. 11, 2000

(51) Int. Cl.[7] .............................................. G01R 31/00
(52) U.S. Cl. ...................... 702/120; 702/117; 702/122; 702/182; 710/110; 714/44
(58) Field of Search .......................... 702/117–122, 58, 702/182, 183, 186; 714/39, 43, 44; 710/105, 710/106, 110

(56) References Cited

U.S. PATENT DOCUMENTS

| | | | | |
|---|---|---|---|---|
| 3,873,818 | A | 3/1975 | Barnard | 714/724 |
| 4,525,802 | A * | 6/1985 | Hackamack | 361/683 |
| 4,890,102 | A * | 12/1989 | Oliver | 714/712 |
| 4,901,259 | A * | 2/1990 | Watkins | 703/2 |
| 5,049,814 | A * | 9/1991 | Walker et al. | 714/736 |
| 5,177,630 | A * | 1/1993 | Goutzoulis et al. | 359/135 |
| 5,410,547 | A * | 4/1995 | Drain | 714/732 |
| 5,444,716 | A * | 8/1995 | Jarwala et al. | 714/727 |
| 5,475,624 | A * | 12/1995 | West | 703/15 |
| 5,581,742 | A * | 12/1996 | Lin et al. | 716/4 |
| 5,583,874 | A * | 12/1996 | Smith et al. | 714/712 |
| 5,583,893 | A | 12/1996 | Nguyen | 375/357 |
| 5,606,567 | A * | 2/1997 | Agrawal et al. | 714/732 |
| 5,778,004 | A * | 7/1998 | Jennion et al. | 714/724 |
| 5,781,718 | A | 7/1998 | Nguyen | 714/33 |
| 5,784,581 | A * | 7/1998 | Hannah | 710/110 |
| 5,887,050 | A * | 3/1999 | Fenske et al. | 379/4 |
| 5,889,936 | A * | 3/1999 | Chan | 714/39 |
| 5,937,154 | A * | 8/1999 | Tegethoff | 714/30 |
| 5,946,472 | A * | 8/1999 | Graves et al. | 703/6 |
| 5,951,704 | A * | 9/1999 | Sauer et al. | 714/736 |
| 5,959,911 | A * | 9/1999 | Krause et al. | 365/201 |
| 5,999,002 | A | 12/1999 | Fasnacht et al. | 324/525 |
| 6,002,868 | A * | 12/1999 | Jenkins et al. | 717/105 |
| 6,049,896 | A | 4/2000 | Frank et al. | 714/46 |
| 6,069,494 | A * | 5/2000 | Ishikawa | 326/86 |
| 6,073,193 | A * | 6/2000 | Yap | 710/100 |
| 6,148,354 | A * | 11/2000 | Ban et al. | 710/301 |
| 6,154,803 | A | 11/2000 | Pontius et al. | 710/310 |

(Continued)

FOREIGN PATENT DOCUMENTS

JP 04122141 A * 4/1992 ........... H04L 12/26

OTHER PUBLICATIONS

Krstic, A. et al., "Testing High Speed VLSI Devices Using Slower Testers". VLSI Test Symposium, 1999. Proceedings. 17th IEEE, 1999. Page(s): 16-21.*

(Continued)

*Primary Examiner*—Patrick Assouad
*Assistant Examiner*—Jeffrey R West
(74) *Attorney, Agent, or Firm*—Christopher P. Maiorana, PC

(57) ABSTRACT

An apparatus coupled to a low speed tester and a device is disclosed. The device may have a first speed faster than a second speed of the low speed tester. The apparatus may be configured to allow the low speed tester to perform high speed tests of the device at the first speed.

25 Claims, 4 Drawing Sheets

U.S. PATENT DOCUMENTS

| | | | | |
|---|---|---|---|---|
| 6,157,975 | A * | 12/2000 | Brief et al. | 710/104 |
| 6,189,109 | B1 | 2/2001 | Sheikh et al. | 714/1 |
| 6,202,103 | B1 | 3/2001 | Vonbank et al. | 710/15 |
| 6,304,982 | B1 * | 10/2001 | Mongan et al. | 714/38 |
| 6,320,866 | B2 * | 11/2001 | Wolf et al. | 370/420 |
| 6,324,663 | B1 * | 11/2001 | Chambers | 714/726 |
| 6,330,241 | B1 | 12/2001 | Fort | 370/395.1 |
| 6,343,260 | B1 * | 1/2002 | Chew | 702/122 |
| 6,345,373 | B1 * | 2/2002 | Chakradhar et al. | 714/738 |
| 6,393,588 | B1 * | 5/2002 | Hsu et al. | 714/43 |
| 6,404,218 | B1 | 6/2002 | Le et al. | 324/763 |
| 6,535,831 | B1 * | 3/2003 | Hudson et al. | 702/124 |
| 6,571,357 | B1 * | 5/2003 | Martin et al. | 714/28 |
| 6,704,888 | B1 * | 3/2004 | Caudrelier et al. | 714/37 |
| 6,735,720 | B1 | 5/2004 | Dunn et al. | 714/43 |
| 2001/0047253 | A1 * | 11/2001 | Swoboda | 703/26 |
| 2002/0011516 | A1 * | 1/2002 | Lee | 235/380 |

OTHER PUBLICATIONS

Catalyst Enterprises, Inc., "SBAE-10" Bus Analyzer-Exerciser User's Manual (Jul. 3, 2000) and Analyzer/Exerciser/Tester specification sheet (Mar. 21, 2000).*

USB Info: Frequently Asked Questions, http://www.psism.com/usbfaq.htm. 1995-2002.*

FOLDOC: Free On-Line Dictionary of Computing, "host" and "emulation", http://foldoc.doc.ic.ac.uk/foldoc/index.html.*

Steven P. Larky et al., Universal Serial Bus (USB) Golden Production Test Mode, Serial No. 09/658,894, filed Sep. 11, 2000.

FOLDOC, "DB-25", http://foldoc.doc.ic.ac.uk/foldoc/foldoc.cgi?query=db+25&action=Search, 1993.

* cited by examiner

APPARATUS AND METHOD TO TEST HIGH SPEED DEVICES WITH A LOW SPEED TESTER

CROSS REFERENCE TO RELATED APPLICATIONS

The present application relates to co-pending application Ser. No. 09/658,894 filed Sep. 11, 2000.

FIELD OF THE INVENTION

The present invention relates to a method and/or architecture for verifying operation of a Universal Serial Bus (USB) device generally and, more particularly, to a method and/or architecture for verifying operation of a USB device with a production test mode device.

BACKGROUND OF THE INVENTION

The Universal Serial Bus (USB) Specification, Version 2.0, (published April 2000 and hereby incorporated by reference in its entirety) defines a high speed mode that operates at 480 MHz. Testing of such high speed devices can be difficult. Conventional solutions for implementing high speed testing include: (i) running tests on an expensive tester capable of 480 MHz operation; (ii) not performing at speed production testing (i.e., assuming the part is correct by design and operates at the high speed) and/or (iii) using a golden parts tester implementation for comparison purposes. A golden parts tester is a test-mode capable slave device, identical to the device which is being tested, that is capable of performing tests. There are disadvantages to each of the conventional approaches.

The first approach of simply implementing a high speed tester capable of 480 MHz testing is not a cost effective solution. Conventional high speed testers capable of 480 MHz operation and able to process a USB 2.0 design (which is largely digital) are at the state of the art in testers and, therefore, expensive. Furthermore, even a fast tester (i.e., a 480 MHz tester) can be problematic. Conventional at speed testers implement an internal phase lock loop (PLL) at 480 MHz. Synchronization of the 480 MHz tester to an incoming data rate is difficult. Verification of the incoming data rate is also difficult. Conventional high speed testers require a complex scheme to synchronize to a device under test (DUT). Additionally, the PLL will vary in phase from device to device and from test to test.

The second approach of not performing at speed production testing implies that the device is correct by design and well within the specification limits with a sufficient margin, as proven by full characterization. Specifically, not performing 480 MHz testing does not require expensive testing devices. Not performing at speed testing assumes that there are no plausible defects that can inhibit at speed operation (i.e., 480 MHz operation).

The approach of implementing a golden parts tester implementation (i.e., a replica of a target-only device implemented as a tester) for comparison purposes is not a possible tester solution for non peer-to-peer devices. The golden parts tester implementation cannot allow a replica of a target-only device to test another target-only device. A non peer-to-peer device (i.e., a USB device) cannot communicate to another non peer-to-peer device since they are non peer-to-peer devices.

USB implementations require a master and a slave device. However, slave devices cannot initiate communication. The golden part device expects to be a target (i.e., a slave) device and not a control (i.e., master) device. The golden parts tester cannot be implemented for a non peer-to-peer device, since peer-to-peer devices are not target-only devices. For example, a USB bus is not a peer-to-peer bus and the golden parts tester implementation is unable to communicate with another target-only device.

Therefore, it is desirable to provide a method and/or architecture to (i) enable slave devices to test other slave devices and/or (ii) add test mode enhanced slave device capabilities to a tester in order to test other non test mode slave devices.

SUMMARY OF THE INVENTION

One embodiment of the present invention concerns an apparatus comprising a plurality of target devices. At least one of the plurality of target devices may be configured as a control test device and may be capable of performing testing of the plurality of test devices.

Another embodiment of the present invention concerns an apparatus coupled to a low speed tester and a device. The apparatus may be configured to allow the low speed tester to perform high speed tests of the device.

The objects, features and advantages of the present invention include providing a method and/or architecture for verifying operation of a USB device that may (i) allow a low cost tester to verify high speed functionality, (ii) verify functionality of a part, (iii) enhance capabilities of a tester, (iv) create a test mode control (e.g., master) function in a target (e.g., slave) device and/or (v) allow testing of a target device by reconfiguring a replica of a target device as a control device.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide a method and/or architecture to verify a peripheral device (e.g., a USB 2.0 device) at a high speed operating frequency (e.g., 480 MHz). The present invention may provide such a verification in a production test facility without having to resort to an expensive tester capable of direct 480 MHz testing. The present invention may enhance an otherwise incapable tester device to perform testing of high speed devices. The present invention may provide a control test (e.g., master) function in a target (e.g., slave) device. Additionally, the present invention may test a target device by reconfiguring a replica of the target device as a control test device (e.g., a golden part).

Figure 1:
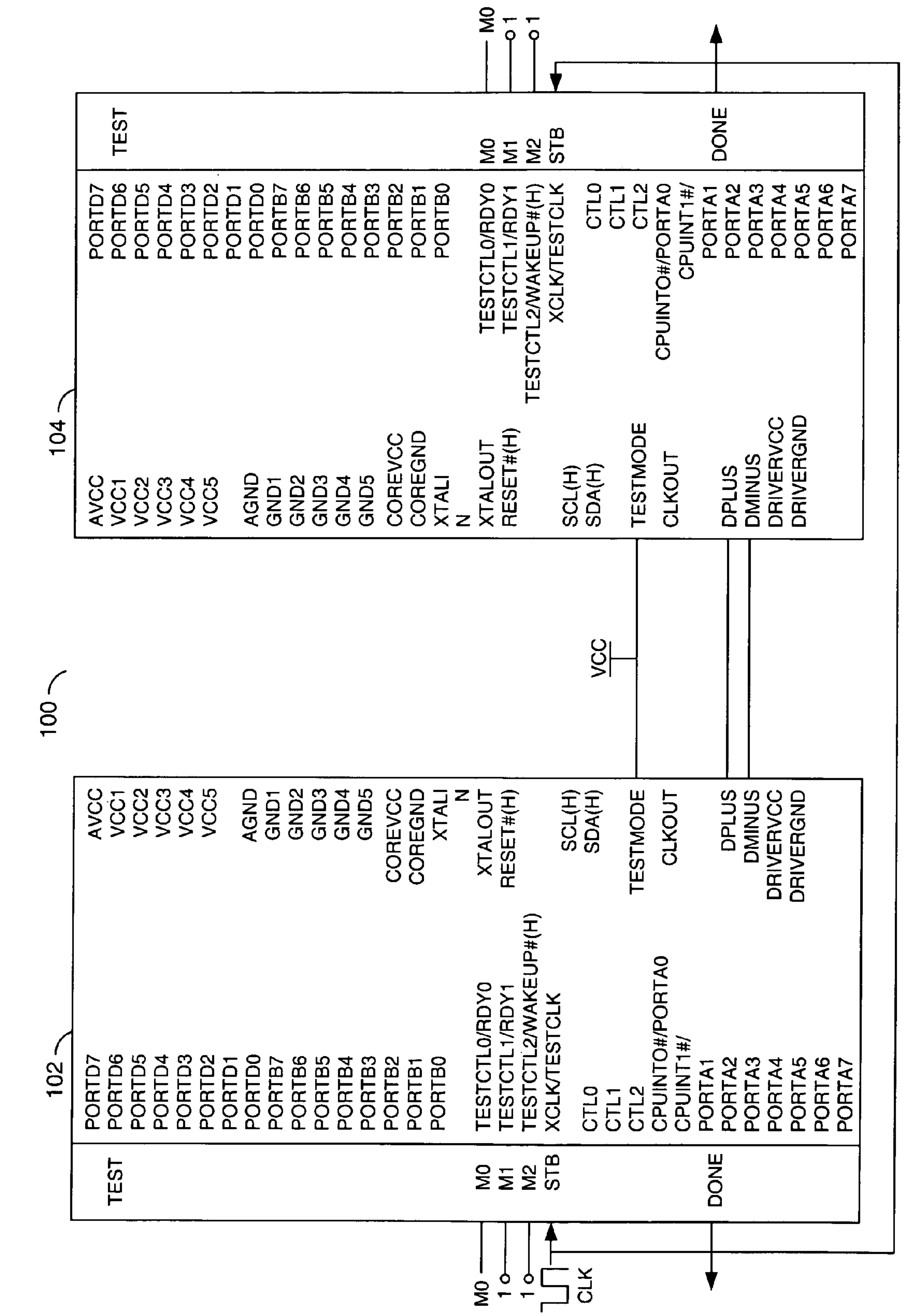
FIG. 1 is a block diagram of a preferred embodiment of the present invention.

Referring to FIG. 1, a block diagram of a circuit 100 is shown in accordance with a preferred embodiment of the present invention. The circuit 100 may illustrate a testing implementation of a target device by reconfiguring a replica of the target device as a test control device (golden part). The structure of the circuit 100 generally comprises a block (or circuit) 102 and a block (or circuit) 104. In one example, the circuit 102 may be implemented as a golden part and the circuit 104 may be implemented as a device under test (DUT). However, the circuit 102 and the circuit 104 may each be implemented as another appropriate type device in order to meet the criteria of a particular implementation.

Initially, the golden part 102 may need to be tested and/or configured during fabrication. The golden part 102 may be required to be pre-tested to ensure full functionality. The golden part 102 may be similar and/or identical to the DUT 104. The circuit 102 may be implemented as a golden part to transmit and receive data to/from the DUT 104. The golden part 102 may implement a number of test modes in order to thoroughly test the DUT 104 (via transmit and receive operations). For example, the test modes may be implemented to test high speed operation, low speed operation, power down operation, suspend operation, etc. However, the golden part 102 and the DUT 104 may be required to be in a test mode operation in order to provide testing. The test modes of the golden part 102 and the DUT 104 may be asserted/deasserted by an external device (not shown). In a preferred implementation, the test modes may be controlled by a tester.

The circuit 102 may be implemented as a control device and the circuit 104 may be implemented as a target device. The circuit 102 may be configured via a number of input pins. For example, a particular test mode may be selected via a predetermined criteria. The golden part 102 and the DUT 104 may be configured to transfer and receive data in a target (e.g., slave) and control test (e.g., master) type configuration. The DUT 104 may be implemented as a target (e.g., slave) device of the golden part 102. The transmission and reception of the master/slave type configurations of the DUT 104 may allow the circuit 100 to verify both a transmit and receive operation of the DUT 104. The DUT 104 may transmit a packet of data in response to the golden part 102. The circuit 102 and/or the circuit 104 may be controlled by a tester, state machine, etc. Additionally, the circuit 102 and the circuit 104 may be implemented on a single tester loadboard.

The golden part 102 may be similar to the DUT 104. In particular, the golden part 102 may be a replica of the DUT 104. However, the golden part 102 may be reconfigured to provide a testing interface with the DUT 104. The golden part 102 may be reconfigured through conventional input/output pins when in the test mode. A test command may be received at an input (e.g., MO, M1 and/or M2) of the golden part 102 and/or the DUT 104. The test commands may be initiated by a tester, a state machine, or the golden part where applicable. The golden part 102 may transmit the test packet based on the simple test command. The DUT 104 may receive and re-transmit the test packet from the golden part 102. However, the DUT 104 may transmit a single packet, only after receiving a single packet from the golden part 102.

The test packet may allow the golden part 102 to verify the DUT 104. For example, the DUT 104 may (i) receive the test packet from the golden part 102 and test the packet for corruption;

(ii) compare the packet to ensure an accurate reception; and (iii) transmit a test packet back to the golden part 102. The golden part 102 may then test the packet for corruption. The golden part 102 may compare the packet to ensure an accurate transmission operation of the DUT 104. The reception and transmission of the test packet may be implemented to verify the DUT 104. Results of the comparison are generally available on an external pin (e.g., DONE) of the golden part 102 and/or the DUT 104 such that a pass/fail determination can be made. The pass/fail determination may be indicated by an asserted/deasserted signal.

The test packet sent and/or received by the DUT 104 may be of any applicable pattern loaded into an internal memory of the circuit 100 (not shown). Additionally, test packet comparison logic (not shown) may be shared with the test packet generation logic (not shown) of the golden part 102, since the data packet is generally similar in both transmission and reception. The circuit 100 may allow the DUT 104 to transmit a packet to the golden part 102. Additionally, the golden part 102 may validate the packet received from the DUT 104. In a production test environment, control of transmission of the packet and the pass/fail signal (e.g., DONE) may be based on a low-speed asynchronous test interface (to be discussed in connection with FIGS. 3 and 4).

By reversing the roles of the golden part 102 and DUT 104, the circuit 100 may allow both the transmission and the reception operations of the DUT 104 to be verified. The circuit 100 may allow both the golden part 102 and the DUT 104 to run with crystals in an asynchronous fashion. The crystals may be different frequencies (e.g., slightly different frequencies, in order of ½%, 1% difference, sometimes less than ½% difference) in order to verify the ability of the DUT 104 to adapt to phase, as well as frequency differences that may be encountered in actual use. The circuit 100 may allow for deviations of frequency on the transmitted or received signals via a number of signals (e.g., DPLUS and DMINUS).

The circuit 100 may provide a special test mode that may allow a standard peripheral part that is normally a target device (e.g., a slave device) to become a host device (e.g., a master device) of a bus. For example, the circuit 100 may allow a slave device to become a host to control testing of a similar slave device. The circuit 100 may verify transmit and receive operations of a test device under test. Additionally, the circuit 100 may allow a non peer-to-peer device to be tested in a peer-to-peer like mode.

Figure 2:
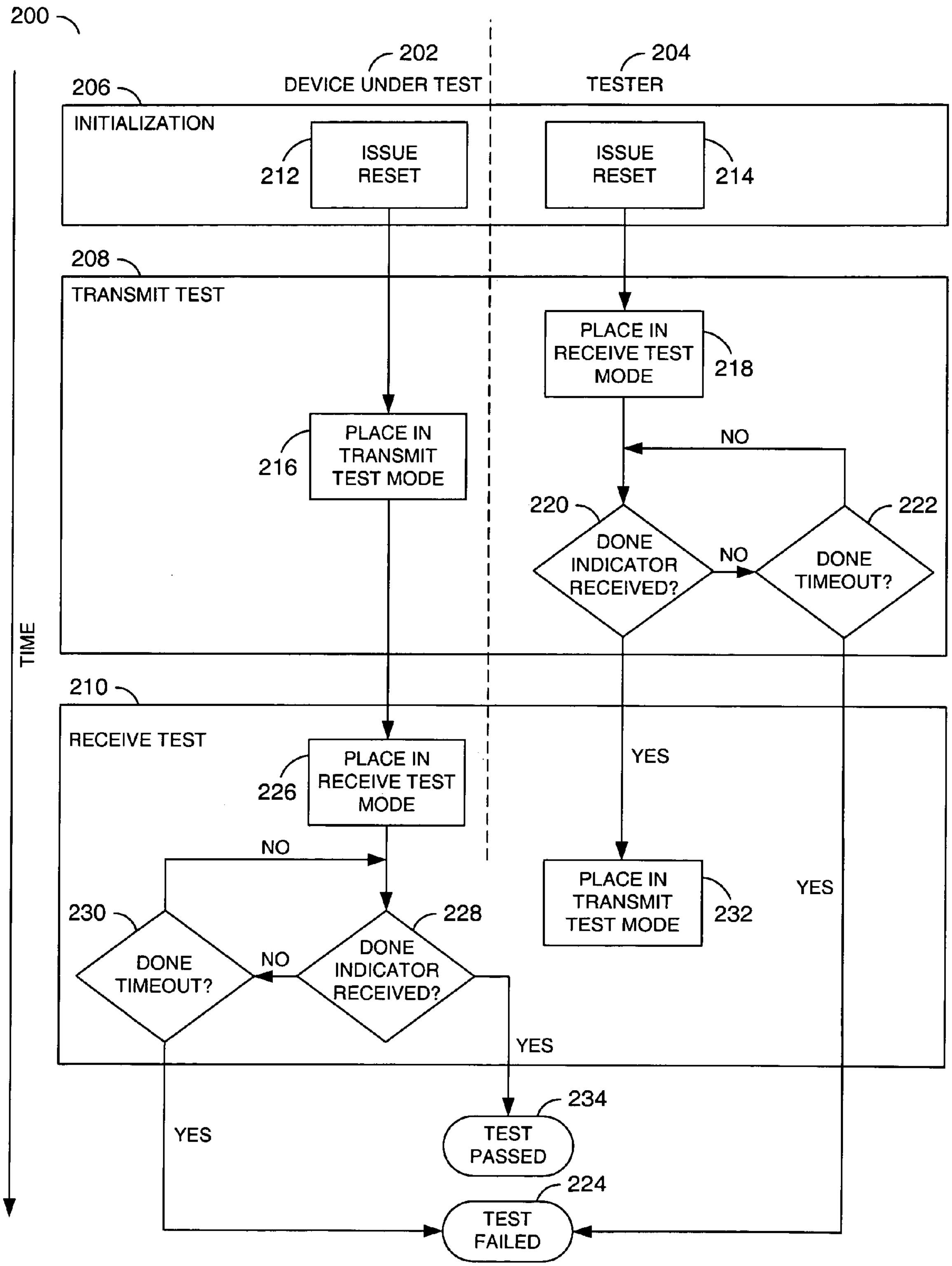
FIG. 2 is a flow diagram illustrating an operation of the present invention of FIG. 1.

Referring to FIG. 2, a block diagram of a method (or process) 200 is shown in accordance with the present invention. The method 200 may be implemented to provide testing of a device. The method 200 may illustrate an exemplary operation of the circuit 100. The method 200 generally comprises a portion 202 illustrating steps of the operation of a device under test and a portion 204 illustrating steps of the operation of a tester operation. The device under test portion 202 may illustrate an operation of a target-only device (e.g., the DUT 104). The tester operation portion 204 may illustrate an operation of a control test replica (e.g, the golden part 102) of the target-only device. The method 200 generally comprises an initialization section 206, a transmit test section 208 and a receive test section 210. The initialization section 206 may initialize the golden part 102 and the DUT 104. The transmit test section 208 may test a transmission operation of the DUT 104. The receive test section 210 may test a reception operation of the DUT 104.

The initialization section 206 generally comprises an issue reset block 212 (for the device under test section 202) and an issue reset block 214 (for the tester section 204). The method 200 may be implemented to reset a device under test and a tester device. For example, the method 200 may reset the golden part 102 and the DUT 104. In one example, the reset block 212 and the reset block 214 may be controlled by an external device (e.g., a tester). However, the reset block 212 and the reset block 214 may be controlled by another appropriate device in order to meet the criteria of a particular implementation.

The transmit test block 208 generally comprises a place in transmit mode state 216 (for the device under test portion 202) and a place in receive test mode state 218, a decision block 220 and a decision block 222 (for the tester portion 204). The place in transmit test mode state 216 may place a DUT in a transmit test mode. The place in receive test mode state 218 may place a tester device in a receive test mode. The place in transit mode state 216 and the place in receive mode state 218 may allow a tester device to correctly test a transmit operation of the DUT. The tester portion (e.g., the golden part 102) 204 may control the DUT portion (e.g., the DUT 104) 202 during the transmit test block 208. Additionally, the DUT portion 202 and/or the tester portion 204 may be controlled by another appropriate device.

The place in transmit test mode state 216 may proceed to the receive test section 210, in response to a predetermined criteria. The place in transmit test mode 216 may proceed to the receive test section 210 in response to a specified time constraint (e.g., a USB time constraint) that may allow sufficient time for the transmit test to occur. However, the system 200 may be configured to respond to an internal signal, external signal, completion signal, etc. in order to meet the criteria of a particular implementation.

The decision state 220 may determine if a “DONE indication” has been received. The DONE indication may be implemented internal to the tester 204. However, the DONE indication may be generated by another appropriate device in order to meet the criteria of a particular implementation. The DONE indication may indicate if a test packet has been correctly received by the tester device. If the DONE indication has been received, the decision block 220 may proceed to the receive test section 210. If the DONE indication is not received, the decision block 220 may move to the decision block 222. The decision block 222 may determine if a “DONE timeout” is to occur. In one example, the DONE timeout may be implemented as a specified time constraint. However, the DONE timeout may be controlled by another appropriate type device. If a DONE timeout is to occur, the decision block 222 generally proceeds to a test failed block 224. If a DONE timeout is not to occur, the decision block 222 may proceed to the decision block 220, repeating the DONE indication process (e.g., the decision blocks 220 and 222).

The receive test section 210 generally comprises a place in receive test mode state 226, a decision state 228 and a decision state 230 (for the device under test section 202) and a place in transmit test mode state 232 (for the tester section 204). The tester 204 may be implemented to control the DUT 202 during the receive test block 210. However, the DUT 202 and/or the tester 204 may be controlled by another appropriate type device. The state 226 may place the DUT in a receive test mode. The decision block 228 may check if a “DONE indication” has been received. The DONE indication may indicate if a test packet has been correctly received by the DUT. The DONE indication may be implemented internal to the DUT 202. However, the DONE indication may be generated by another appropriate type device in order to meet the criteria of a particular implementation. If a DONE indication has been received, the decision block 228 may enter a test passed state 234. If a DONE indication is not received, the decision block 228 may enter the decision block 230. If the decision block 230 determines that a “DONE timeout” is to occur, the decision block 230 may enter the test failed block 224. If the decision block 230 determines that a DONE timeout is not to occur, the decision block 230 may move to the decision block 228.

The method 200 may illustrate testing of a target-only device with a replica of the target-only device. For example, the method 200 may illustrate testing of the DUT 104 with the golden part 102. Each state of the method 200 may be independently controlled and/or implemented in order to meet the criteria of a particular implementation. However, in a preferred embodiment, an external tester may control the golden part 102 and/or the DUT 104. The golden part 102 may be configured to perform tests on the DUT 104.

Figure 3:
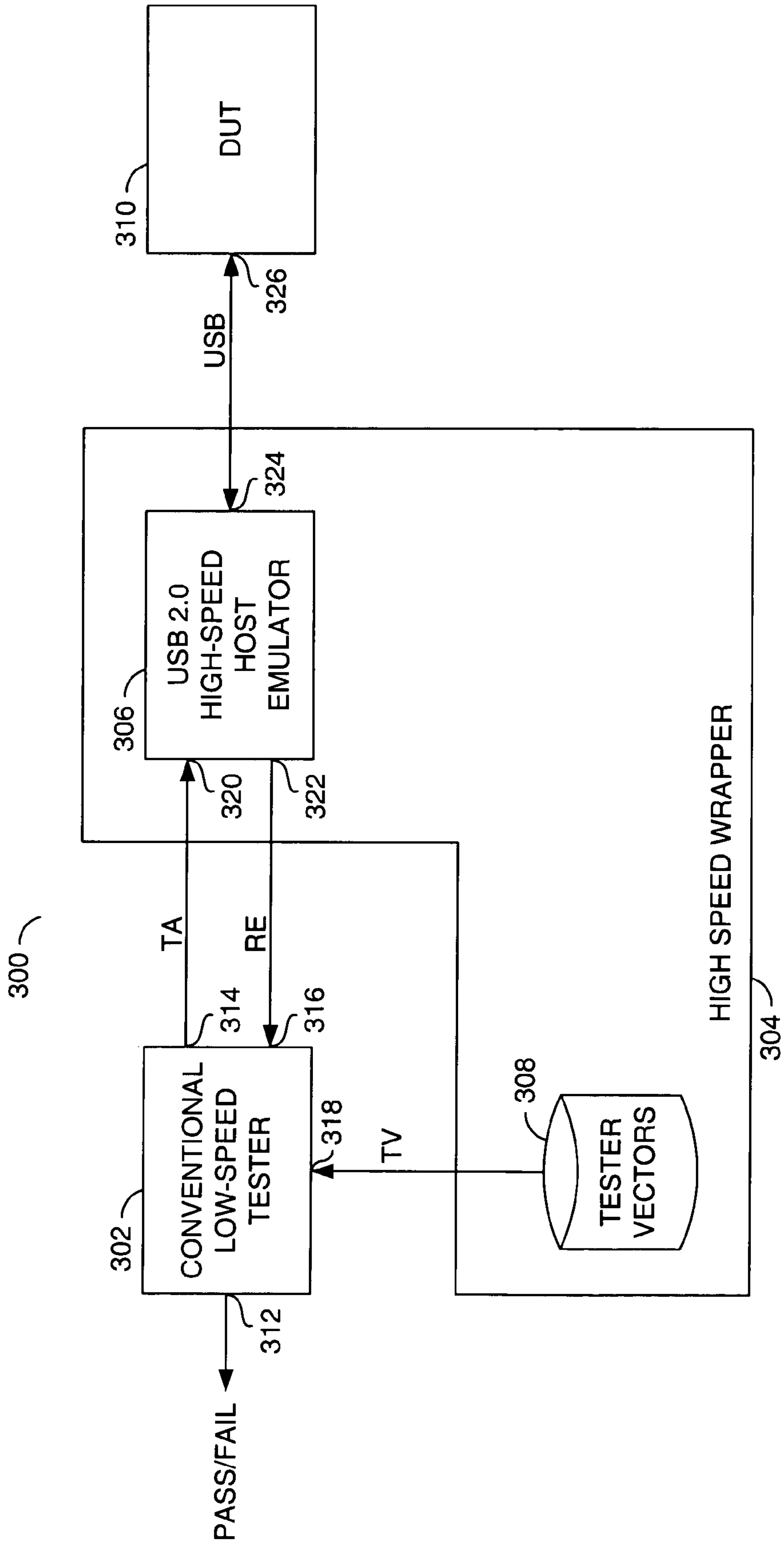
FIG. 3 is a block diagram of a preferred embodiment of the present invention.

Referring to FIG. 3, a system 300 is shown illustrating a high speed testing device derived from a low speed tester. The circuit 300 may allow testing of a device to be controlled by a low-speed asynchronous test interface. The system 300 generally comprises a conventional low speed tester 302 and a high speed wrapper 304. The high speed wrapper 304 may allow the conventional low speed tester 302 to implement high speed testing of devices. The high speed wrapper 304 generally comprises a high speed host emulator 306 and a tester vectors section 308. The high speed host emulator 306 and the test vectors section 208 may be implemented to perform high speed tests. The high speed wrapper 304 may allow the conventional low speed tester to test a high speed device.

The conventional low speed tester 302 may have an output 312 that may present a signal (e.g., PASS/FAIL), an output 314 that may present a transmission signal (e.g., TA), an input 316 that may receive a reception signal (e.g., RE) and an input 318 that may receive a signal (e.g., TV). The signal PASS/FAIL may indicate a pass/fail condition of a DUT 310. The signal PASS/FAIL may be asserted and/or deasserted to indicate a particular condition of the DUT 310. The test vectors section 308 may generate the signal TV. In one example, the signal TV may be implemented as testing vectors. However, the signal TV may be implemented as another appropriate type signal in order to meet the criteria of a particular implementation. The tester vectors 308 may provide testing vectors TV to the conventional low speed tester 302 in order to test the DUT 310.

An input 320 of the high speed host emulator 306 may receive the signal TA. An output 322 of the high speed host emulator 306 may present the signal RE. Additionally, the high speed host emulator 306 may have an input/output 324 that may present/receive a signal (e.g., USB). An input/output 326 of the DUT 310 may present/receive the signal USB. In one example, the signal USB may be implemented as a bi-directional high speed interface signal (e.g., a USB bus). However, the signal USB may be implemented as another appropriate type signal (e.g., firewire, etc.) in order to meet the criteria of a particular implementation. The signal USB may allow the conventional low speed tester 302 (via the high speed wrapper 304) to perform verification of the DUT 310.

Figure 4:
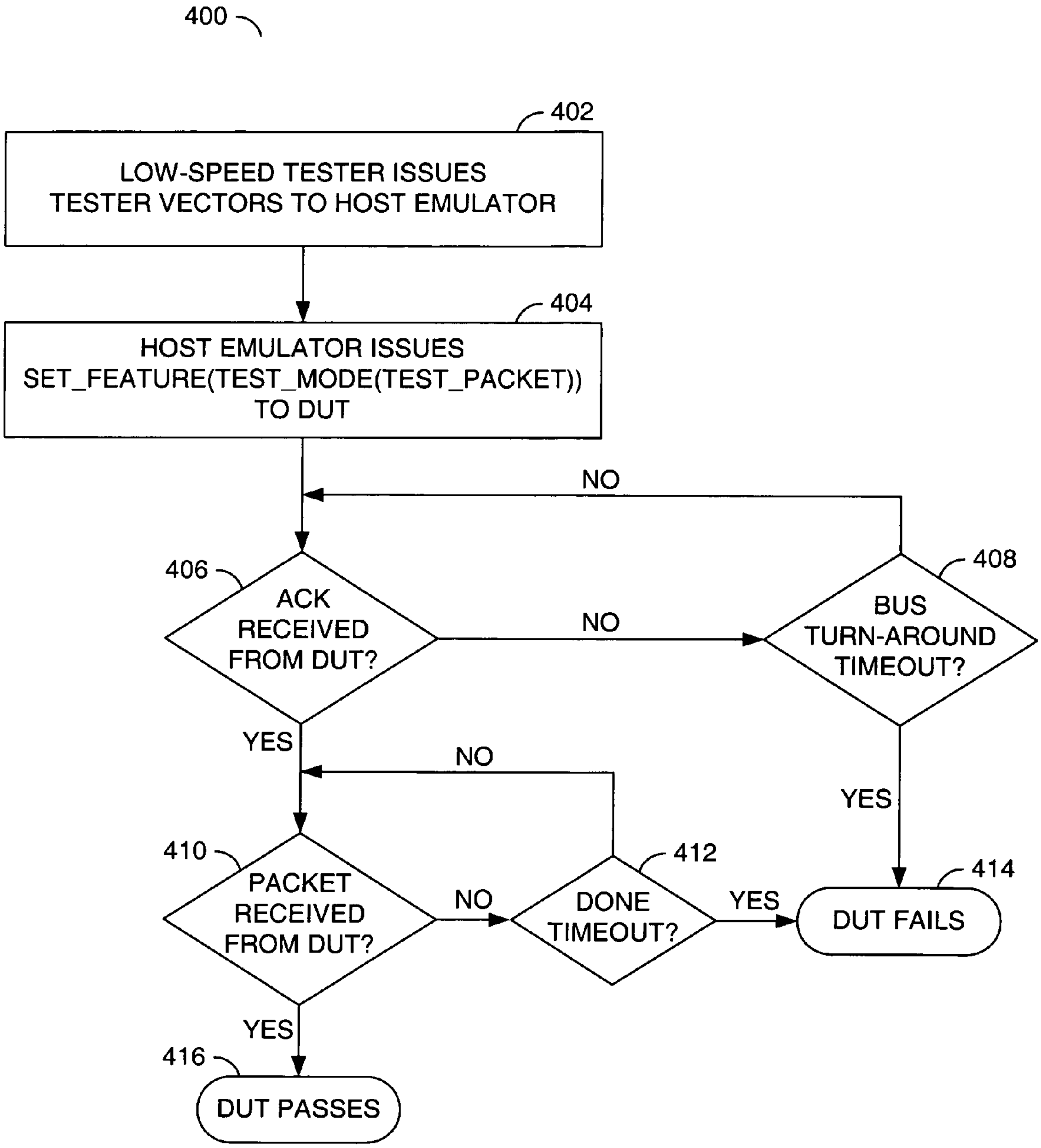
FIG. 4 is a flow diagram illustrating an operation of the present invention of FIG. 3.

Referring to FIG. 4, a flow diagram 400 is shown illustrating an operation of the system 300. The flow diagram 400 generally comprises a state 402, a state 404, a decision block 406, a decision block 408, a decision block 410, a decision block 412, a result state 414 and a result state 416. The state 402 may implement the low-speed tester 302 to issue a number of tester vectors to the host emulator 306. The state 404 may implement the host emulator 306 to issue a number of features to the device under test 310. The host emulator may be implemented as a test capable slave device. For example, the host emulator may be implemented as a USB host adapter. The test capable slave device may emulate a host device to transmit test packets. The state 402 and the state 404 may be controlled.

The decision block 406 may check to see if an acknowledge signal is received from the device under test 310. If an acknowledge signal is received, the decision block 406 may move to the decision block 410. If an acknowledge signal is not received, the decision block 406 may move to the decision block 410. The acknowledge signal may be generated in response to an acknowledgment packet. The acknowledgment packet may be implemented as a handshake packet. The acknowledgment signal may confirm at a transmit and receive operation of the DUT 310.

The decision block 408 may check for a bus turnaround timeout. The bus turnaround timeout may be implemented as a USB specified time constraint that may determine how long after a master device (e.g., the host emulator 306) sends a packet to wait for a target device (e.g., the DUT 310) to respond. The time duration may be short. However, the bulk of the time constraint may be devoted to tester setup and/or setting time. The USB turnaround time is generally 192 bit times (e.g., 384 ns). If a bus turnaround timeout occurs, the decision block 408 may move to the result block 414 and the device under test 310 fails. If a bus turnaround timeout does not occur, the decision block 408 may move back to the decision block 406. The decision block 410 may check to see if a packet has been received from the device under test 310. If the packet has been received, the decision block 410 may move to the result block 416 and the device under test 310 passes. If a packet has not been received from the device under test, the decision block 410 may move to the decision block 412. The decision block 412 may check for a "DONE timeout". If a DONE timeout has been received, the decision block 412 may move to the result block 414 and the device under test 310 generally fails. If the DONE timeout has not been detected, the decision block 412 may move back to the decision block 410.

The system 100 (or 300) may allow a low-cost, low-speed tester to test a high-speed target-only part. Compared to existing methods, the present invention allows a low-cost tester to verify the high-speed functionality of a complex part. The system 100 (or 300) may allow a target-only (non peer-to-peer) USB device to act as an initiator of test packets. The system 100 may adapt USB 2.0 defined (e.g., required) test modes for implementation in a production test environment. The system 100 may extend capability of a USB target-only device to verify the reception of a test packet. Additionally, the system 300 may allow high-speed transmit, reception, and response checking to be under control of a low-speed tester-friendly interface.

The system 100 (or 300) may reduce test costs for a cost-sensitive but high-performance part. The system 100 may be applicable to devices for busses that are not peer-to-peer, such that using a golden part to verify a device under test requires the device to support a newly defined peer-to-peer test mode. Using the test method described, the functionality of the part can be verified not only in the ideal environment of a tester (e.g., using a fully synchronous high-speed tester) but is also verified in the more real-world situation of a slightly varying phase and frequency. The circuit 100 (or 300) may provide a level of verification that may be more complete than would be possible with a conventional high-speed tester.

The function performed by the flow diagrams 200 and/or 400 of FIGS. 2 and 4 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:

a low speed tester; and a host emulator having (i) a first interface coupled to said low speed tester to receive a test vector at a first speed, (ii) a second interface configured to (a) transmit a first test packet to a device at a second speed faster than said first speed and (b) receive a response from said device and (iii) a third interface to said low speed tester to transfer a first done signal based upon said response, wherein said apparatus is configured to allow said low speed tester to perform high speed tests of said device at said second speed.

2. The apparatus according to claim 1, wherein said host emulator is further configured to perform a verification of said device.

3. The apparatus according to claim 1, wherein said device comprises a Universal Serial Bus (USB) device.

4. The apparatus according to claim 1, further comprising:

a test vector generator configured to transfer said test vector to said low speed tester.

5. The apparatus according to claim 4, wherein said low speed tester is configured to control said host emulator.

6. The apparatus according to claim 4, wherein said low speed tester is configured in response to said test vector.

7. The apparatus according to claim 6, wherein said test vector generator is configured to generate said test vector.

8. The apparatus according to claim 1, wherein said apparatus is further configured to test a reception and transmission operation of said device.

9. The apparatus according to claim 1, wherein said device is further configured to receive and verify said first test packet.

10. The apparatus according to claim 1, wherein said device is further configured to initiate transmission of one or more second test packets under control of said host emulator.

11. The apparatus according to claim 10, wherein said host emulator is further configured to receive and verify said one or more second test packets.

12. The apparatus according to claim 1, wherein said low speed tester is further configured to (i) make a decision for a pass/fail condition of said device based on said response and (ii) generate a pass/fail signal indicating said decision.

13. The apparatus according to claim 1, wherein said apparatus is configured to perform at least one test of a plurality of test modes wherein said plurality of test modes comprise USB 2.0 defined test modes for use in a production test environment.

14. An apparatus comprising:

means for transferring a test vector at a first speed from a low speed to a first interface of a host emulator;

means for transmitting a first test packet from a second interface of said host emulator to a device at a second speed faster than said first speed;

means for receiving a response from said device at said second interface; and means for transferring a first done signal based upon said response from a third interface of said host emulator to perform high speed tests of said device at said second speed.

15. A method for testing comprising the steps of:

(A) transferring a test vector at a first speed from a low speed tester to a first interface of a host emulator;

(B) transmitting a first test packet from a second interface of said host emulator at a second speed faster than said first speed to a device;

(C) receiving a response from said device at said second interface; and (D) transferring a first done signal from a third interface of said host emulator to said low speed tester based upon said response to perform high speed tests of said device at said second speed.

16. The method according to claim 15, wherein said device comprises a USB device.

17. The method according to claim 15, further comprising the step of:

configuring said low speed tester to control said host emulator.

18. The method according to claim 17, further comprising the step of:

generating said test vector external to said low speed tester.

19. The method according to claim 15, further comprising performing at least one of a plurality of test modes wherein the plurality of test modes comprise USB 2.0 defined test modes for use in a production test environment.

20. The apparatus according to claim 1, wherein said host emulator is configured to generate said first done signal to indicate one of (i) successful reception of a second test packet initiated from said device within a predetermined time and (ii) no successful reception of said second test packet within said predetermined time.

21. The apparatus according to claim 1, wherein said device is configured to assert a second done signal through a discrete output in response to successfully receiving said first test packet from said host emulator.

22. The method according to claim 15, wherein said first done signal indicates one of (i) successful reception of a second test packet initiated from said device within a predetermined time and (ii) no successful reception of said second test packet within said predetermined time.

23. The method according to claim 15, further comprising the step of:

asserting a second done signal through a discrete output of said device in response to successfully receiving said first test packet from said host emulator.

24. The method according to claim 15, further comprising the step of:

initiating transmission of one or more second test packets from said device under control of said host emulator.

25. The method according to claim 15, further comprising the steps of:

making a decision for a pass/fail condition of said device in said low speed tester based on said response; and generating a pass/fail signal from said low speed tester indicating said decision.

* * * * *